Oct. 15, 1940.  E. E. FREY  2,217,947
LIQUID FLOW CONTROL DEVICE
Filed July 12, 1937
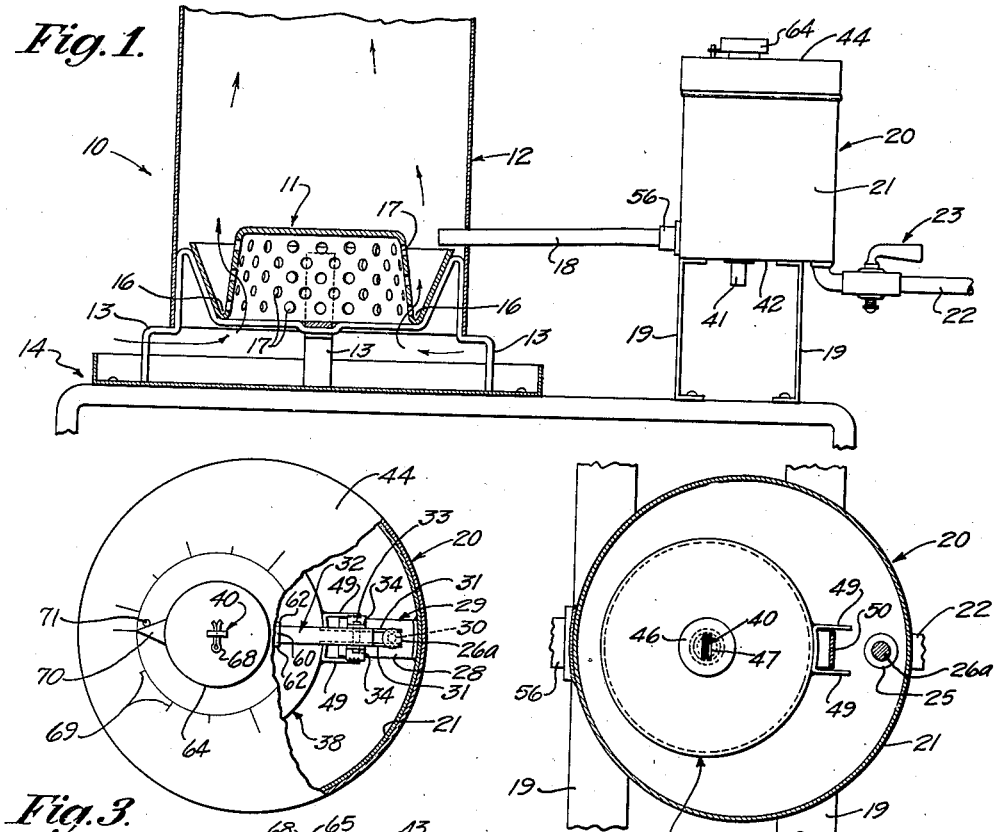
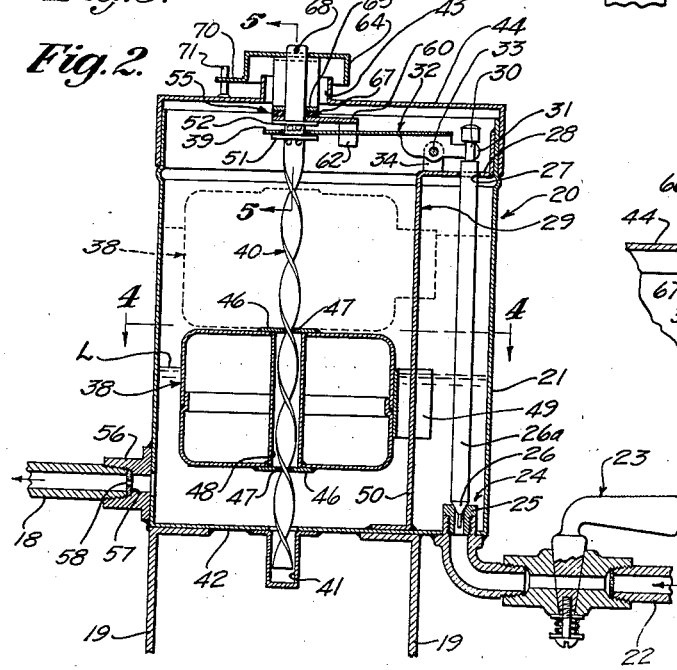
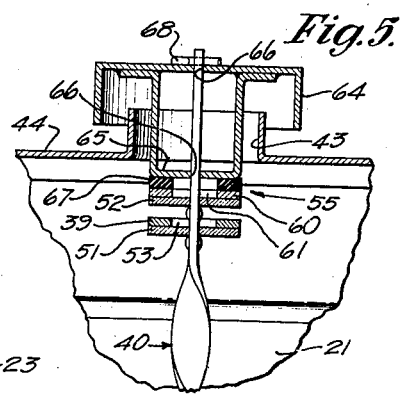
Inventor
Elmer E. Frey.
Attorney Patented Oct. 15, 1940

2,217,947

UNITED STATES PATENT OFFICE 2,217,947

LIQUID FLOW CONTROL DEVICE

Elmer E. Frey, Los Angeles, Calif., assignor to Kittle Manufacturing Co., Los Angeles, Calif., a corporation of California Application July 12, 1937, Serial No. 153,155

1 Claim. (Cl. 137—68)

My invention relates to heating devices and fuel control valves therefor and, in its more particular aspects, it has to do with devices suitable for use in orchard heating systems for preventing damage to trees and fruits by cold and frost.

It is customary, in such systems, to employ a number of heating elements which are supplied with fuel through pipe lines emanating from a common fuel tank. It is frequently the case that the heating elements placed about the orchard are at different elevations, which results in the fuel reaching the heaters at varying pressures. Now it is highly desirable that an orchardist be able to adjust all his heaters to burn at a uniform rate, and to accomplish this it is necessary that the fuel be fed to all the burners at a constant and uniform rate and this result is achieved by my invention.

Of course the utility of my invention is not restricted to orchard protective systems involving a plurality of heaters fed from a common fuel tank, since it has other important uses. For instance, it may be used with equal advantage as a single heater unit supplied with fuel by gravity flow from its individual fuel tank. In such a heater, without my invention, the rate of flow of fuel to the burner varies as the head of fuel in the tank lessens. By incorporating my improvements in a heater of this type, the fuel flow is made constant and uniform regardless of head variations in the main fuel tank.

Generally described, my invention comprises the combination of a fuel burner, a main fuel supply line or tank, an auxiliary fuel reservoir interposed between the burner and main fuel supply and means for maintaining a constant and predetermined head of fuel in the auxiliary reservoir. By way of example, this latter means includes a valve controlling the inlet to the auxiliary reservoir, a float member for actuating the valve and means for setting and adjusting the float to maintain the desired fuel head.

Among the objects of my invention, I aim to provide a heating device including means for delivering fuel to the heater at a given uniform rate of flow.

Another object is to provide a heating device in which the fuel flow control means may be adjusted to increase or decrease the rate of fuel flow in accordance with the variable requirements.

A further object of the invention is to provide means associated with the fuel flow control means for indicating the rate of fuel delivery to the heater.

Other novel features and objects of the invention will be made apparent in the following detailed description, reference being had to the accompanying drawing, in which:

Fig. 1 is a fragmentary side elevation, partly in section, of the heating device;

Fig. 2 is a vertical medial section of the fuel flow control mechanism;

Fig. 3 is a plan view of the mechanism shown in Fig. 2, a portion of the cover being broken away to reveal certain parts positioned therebeneath;

Fig. 4 is a horizontal section taken on line 4—4 of Fig. 2; and

Fig. 5 is a vertical section taken on line 5—5 of Fig. 2.

As shown in Fig. 1, the heater generally indicated at 10 is typically illustrated as comprising a burner 11 and stack 12 mounted upon supporting members 13, which in turn rest upon a supporting frame indicated at 14. While a number of different types of burners may be suitable for the purpose, the burner 11, illustrated as typical, is provided with an annular fuel receiving groove 16 and air admitting apertures 17. The fuel flows continuously from a fuel delivery pipe 18 into groove 16 where it is vaporized and admixed with the air entering through apertures 17, the products of combustion then passing upwardly through the stacks.

The rate of flow of the fuel through delivery pipe 18 is automatically controlled by a fuel flow control device generally indicated at 20. This device comprises an auxiliary fuel reservoir or container 21, supported upon frame members 19, which receives fuel from a main fuel supply tank (not shown) through feed pipe 22. This feed pipe may be provided with a shut-off valve indicated at 23.

As shown in Fig. 2, the flow of fuel through pipe 22 is controlled by a valve generally indicated at 24, which comprises a valve seat 25, provided on the discharge end of pipe 22, and a vertically movable valve closure 26 carried on the lower end of a valve stem 26a. The valve stem is guided for vertical movement within an aperture 27 provided in the horizontal portion 28 of a bracket generally indicated at 29, the latter being suitably attached to the container. The upper end of stem 26a is provided with an annular groove 30, which receives the bifurcations 31 provided at one end of a lever 32 which is pivoted intermediate its ends by a pin 33 which extends through parallel ears 34 provided on bracket 29.

A float member 38, positioned within the container, is connected with the inner free end 39 of lever 32 by a member generally indicated at 40. This member is in the form of a spiral, as indicated, and is guided for rotation and vertical reciprocation, at its lower end, within guide member 41 provided in bottom 42 of the container, and, at its upper end as will later be described, within a neck opening 43 provided in top 44 of the container. Float member 48 is spirally engaged by member 40 by means of a pair of washers 46, secured to the float member at opposite ends of a central opening 48 provided in the float member, which are apertured as indicated at 47 (Fig. 4) to slidably receive spiral member 40. Float member 38 is provided with a pair of flanges 49 which slidably engage the vertical portion 50 of bracket 29 and thus prevent rotation of the float member.

Near its upper end, spiral member 40 is loosely received within a circular opening 53 provided in the free end 39 of lever 32, and is provided with a pair of vertically spaced flanges 51 and 52, which are adapted to engage and actuate arm 39. Spiral member 40 is normally held from rotation by a friction means generally indicated at 55, which will later be described.

The container is provided with an outlet nipple 56 which threadably receives delivery pipe 18. Positioned within the nipple adjacent the end of pipe 18 is a disc 57 provided with a restricted orifice 58. The container is open to atmospheric pressure through neck opening 43.

In operation, fuel enters the container 22, valves 23 and 24 being open, until the fuel level rises to substantially the position indicated at L. At this time, the float member rises to the position indicated in full lines (Fig. 2) moving spiral member 40 upwardly and, flange 51 engaging arm 39, thereby moving lever 32 and closure 26 to the valve closing position. With a given sized orifice in disc 57, a fuel flows through delivery pipe 18 at a given rate depending upon the head or height of fuel level L above orifice 58. As the fuel passes out of the container through the delivery pipe, the lowering fuel level effects a slight downward movement of the float member and a commensurate opening of valve 24 to permit fuel to flow into the container at the same rate that it flows out through orifice 58. Thus a balance is established maintaining the fuel head, and the flow through the delivery pipe, substantially constant.

The rate of fuel flow through the delivery pipe may be varied by a means for varying the fuel head, as will now be described. As shown in Figs. 2 and 5, a member 60 is positioned in engagement with the upper surface of flange 52, and is provided with a circular opening 61 which rotatably receives the upper portion of spiral member 40. Rotation of member 60 is prevented by means of a pair of depending flanges 62, provided thereon, engaging the opposite sides of lever 32. Carried by the upper end of spiral member 40 is an inverted cup-shaped hand knob 64 supported above the top of the container by a U-shaped support member 65, the hand knob and its support being suitably apertured at 66 to receive and drivingly engage the spiral member. Support 65 loosely engages the neck opening 43 in top 44 and thus guides the upper end of spiral member 40 for rotation and vertical reciprocation. Hand knob 64 overhangs neck opening 43 and is sufficiently spaced above neck 43 to permit ample movement of the float member in actuating the vlave 24.

Positioned between support 65 and member 60 is a resilient friction member, here illustrated as comprising a rubber washer 67. A cotter pin 68 is passed through the upper end of the spiral member and serves to retain hand knob 64 on spiral member 40 and support member 65 in frictional engagement with washer 67. Thus, with member 60 held from rotation by flanges 62, washer 67 frictionally resists rotation of spiral member 40.

To increase the rate of fuel flow through delivery pipe 18, hand knob 64 is manually rotated in a counter-clockwise direction (Fig. 3) turning spiral member 40 against the frictional resistance of washer 67 to move the float member vertically upwardly. The weight of the float member then causes closure 26 to move away from seat 25 to permit fuel to enter the container through feed pipe 22 until the fuel level rises sufficiently to buoy the float member. The increased fuel head causes a corresponding increase in the rate of fuel flow through orifice 58 and delivery pipe 18. The balance is then reestablished by the float member restricting the rate of fuel flow into the container to correspond to the rate of fuel flow out of the container.

Indicia 69 are provided on the top 44 of the container, which, associated with a pointer 70 provided on hand knob 64, may indicate either the position of the float member relative to the container, the corresponding fuel head, or the corresponding rate of fuel flow through the delivery pipe, which may be in terms of gallons or fractions of a gallon per hour. A pointer engaging stop pin 71 may be provided on top 44 to restrict the rotative movement of knob 64 and in turn confine the adjustable movement of the float member within certain desired limits, such as indicated in full and dotted lines (Fig. 2).

It will be understood that the drawing and description are to be considered as illustrative of and not restrictive on the broader claim appended hereto, for various changes in design, structure and arrangement may be made without departing from the spirit and scope of said claim.

I claim:

In a fuel flow control device for receiving fuel from a main supply line and delivering it at a constant rate to a burner, a reservoir having an inlet communicating with the fuel supply line and a restricted outlet to the burner, a valve controlling the inlet and means actuating the valve in consonance with the fuel level in the reservoir including a spirally formed float supporting member mounted vertically in the reservoir, a valve actuating flange on the float supporting member, a float mounted on the float supporting member to be vertically moved with respect thereto upon rotation of the float supporting member, a rotatable cap secured to the float supporting member, a friction washer mounted between the cap and flange to resist rotation of the float supporting member, and means for holding said washer against rotation.

ELMER E. FREY.